July 20, 1965  W. W. BULGRIN  3,195,760

SINGLE WALLED DOUBLE COMPARTMENT CONTAINER

Filed March 13, 1962

United States Patent Office 3,195,760
Patented July 20, 1965

3,195,760
SINGLE WALLED DOUBLE COMPARTMENT CONTAINER
Walter William Bulgrin, Akron, Ohio, assignor to The Firestone Tire & Rubber Company, Akron, Ohio, a corporation of Ohio
Filed Mar. 13, 1962, Ser. No. 179,379
1 Claim. (Cl. 220—5)

The present invention relates to containers and in particular to single walled metal beer containers with double compartments.

When beer is initially placed in containers for subsequent dispensing it contains a certain amount of natural carbon dioxide gas which serves to maintain the condition of the beer and keep the flavor lively so long as the container remains sealed. When the container is tapped and as the beer is withdrawn the evacuated space must be filled with a pressure balancing medium of some kind.

If the evacuated space is permitted to be filled with impure air any microorganisms carried in this air will tend to contaminate and impair the flavor of the beer and shorten considerably the useful life of the beer. Also unless the replacement medium enters the container quickly, enough of the natural carbon dioxide gas will be thrown off by the beer itself to fill this evacuated space thus causing a loss of condition of the beer and resulting in a flat taste.

In order to dispense the beer from the container it is necessary to use certain auxiliary equipment, such as pumps, valves and possibly long or involved piping, which equipment often may be a common source of contamination.

To avoid permitting impure air from entering and filling the evacuated space as the beer is withdrawn, it is often considered preferable to use a separate source of carbon dioxide which involves a certain amount of additional equipment such as the gas cylinders themselves in order to dispense the beer under pressure. The use of carbon dioxide gas would be preferable to pump systems requiring facilities for sterilizing the air which is permitted to enter the evacuated space. A further reason for the use of carbon dioxide is that it serves to prevent the natural carbon dioxide in the beer itself from being thrown off inside the container, thereby ensuring that the flavor is kept lively for a longer period of time.

Accordingly, one of the objects of the invention is to provide a single walled metal container having a separate compartment for the storage of carbon dioxide gas.

Another object of the invention is to provide a single walled metal container having double compartments, one for the storage of a suitable gas and the other for the storage of a beverage, the container being readily adaptable for establishing communication between the two compartments when tapped through a conventional and simple equipment.

It is still another object of the invention to provide a method of fabricating single walled double compartment metal containers of various dual volume capacities from a single standard size container type.

The aforementioned objects, and other objects are attained by the novel construction, preferred embodiments of which are shown in the accompanying drawings and described herein.

Figure 1:
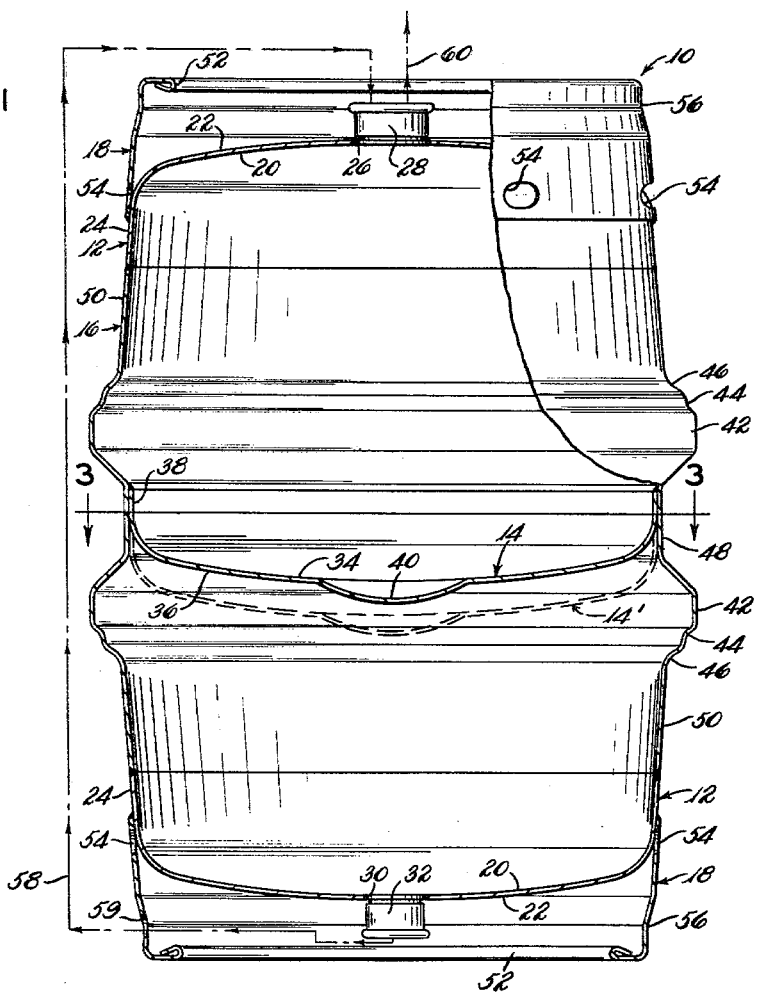
FIG. 1 is an elevation view of the double compartment, single walled metal container of the present invention, partly broken away and in cross section.
Figure 2:
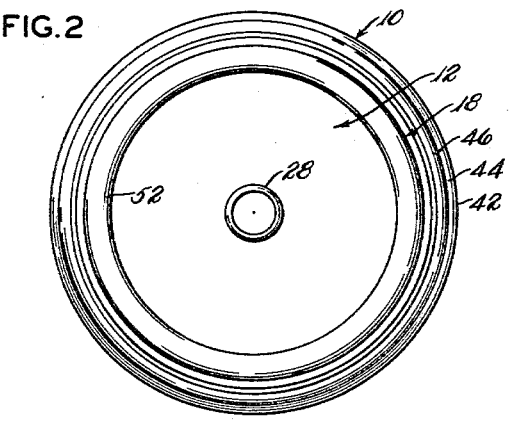
FIG. 2 is a top plan view of the container.
Figure 3:
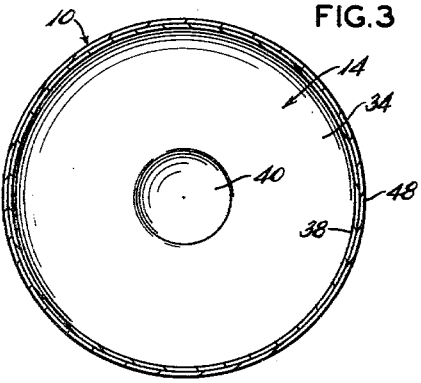
FIG. 3 is a sectional view taken along line 3—3 of FIG. 1.

Referring to FIG. 1, the novel single walled double compartment container 10, constructed preferably of stainless steel because of its corrosion resistant qualities, is shown and comprises basically top and bottom end shells 12, an inner end shell 14, a continuous center band 16 and a chime skirt 18 secured to each of the top and bottom end shells.

Top and bottom end shells

Each of the top and bottom end shells 12 has a smoothly concaved interior surface 20 and a dome shape exterior surface 22, the two surfaces terminating in a substantially axially directed tapered annular flange 24 of predetermined depth.

An aperture 26 is provided in the center of the top end shell to accommodate an axially outwardly projecting fitting 28, the particular one illustrated being known as a "Barnes" adaptor and commonly employed in Great Britain. However, it should be recognized that the invention is not limited to this particular fitting and that other types may also be accommodated so long as carbon dioxide may be introduced while beer is being drawn off through the aperture, with the size of the aperture to be governed by the size of the fitting.

An aperture 30 is provided in the bottom end shell and serves to accommodate an axially outwardly projecting fitting 32, the particular fitting shown being illustrated broadly and only by way of example because the invention will be served by any suitable fitting adapted for the particular purpose which will be later described.

Inner end shell

The inner end shell 14 has on one side a smooth concaved surface 34 and on the other side a convexed surface 36, both surfaces terminating in an axially directed annular flange 38 of predetermined depth. In the center of the inner end shell is a spherical embossment 40 which is formed to project axially outwardly from convexed surface 36. The transition from concaved surface 34 to the interior of the embossment is made as smoothly as possible for a purpose which will be described later.

Center band

The center band 16 is formed from a rectangular sheet of stock and is provided with annular flat configurated rolling surfaces 42 which are formed preferably after the sheet has been formed and secured into a continuous band. The surfaces 42 are reinforced at one side by annular corrugations 44 and 46, respectively, and are spaced by an intermediate portion 48 which occupies a deep radially inward position with respect to the annular flat surfaces for a purpose to be described.

The marginal flanges 50 of the center band 14 may be of varied predetermined axial lengths depending on the desired volumetric capacity of the container, as taught by my copending application 161,471, filed December 22, 1961, now abandoned.

Single walled chime skirt

Each single walled chime skirt 18 is also formed from a rectangular sheet of stock into a continuous band. It is provided at one end with a smooth re-entrant curved flange 52 which projects radially inwardly, a plurality of oblong drain holes 54 which are spaced about the periphery of the chime skirt and an annular corrugation 56 for increasing the rigidity of the skirt. At leat one skirt is provided with peripheral handholes (not shown) diametrically oppositely spaced and the chime skirt which is attached to the bottom end shell 12 is provided with a peripheral opening 56 for a purpose to be described.

The drain holes 54 are located approximately at the point of intersection of the dome shaped exterior surface 22 of an end shell and the chime skirt so as to prevent a collection of liquid and dirt on the end shell exterior surface.

The chime skirts 18 illustrated in FIG. 1 are tapered and secured tangentially to the flange of an end shell; however, they may also be provided with an offset or annular shoulder (not shown) adapted to be seated upon and secured to an end shell, depending upon the particular type of racking equipment for which the container will be designed.

*Steps of fabrication*

The center band 16 and the single walled chime skirts 18 are each formed from a sheet of metal preferably stainless steel, into a cylindrical ring and the ends are abutted and fusion seam-welded together.

The center band is initially expanded or stretched into a bulged shape and then it is passed through a series of cold rolling operations whereby the annular flat configurations or rolling surfaces 42, the annular corrugations 44 and the intermediate portion 48 are formed. The marginal flanges 50 are also tapered during these operations to conform at their edges to the edges of the end shells. In the formation of a double compartment container, using for example a standard type eighteen gallon container construction, if a nine gallon liquid compartment were desired, the upper marginal flange 50, as viewed in FIG. 1 is formed shorter than the lower margin flange and the resulting flange is tapered accordingly to meet at its edges the edges of the top end shell. Alternatively, the center band may be formed from stock of predetermined marginal width according to the size liquid compartment desired. FIG. 1 illustrates a container having a ten gallon liquid compartment which has both upper and lower marginal flanges of the same length.

The re-entrant curve 52 of chime skirt 18, as well as the annular corrugations 56, are also formed by a series of rolling operations, and then the oblong drain holes 54 are punched out.

The end shells 12 and 14 are initially blanked out from metal sheets to form circular discs and then undergo a series of gradual deep draw operations whereby the metal is progressively stretched and tapered into final form. The spherical embossment 40 on the inner end shell 14 is drawn out during the last of these operations. The apertures in the top and bottom end shells 12 are punched out after completion of all the deep draw operations.

The end shells are each formed having a predetermined standard maximum diameter and flange depth so that they may be universally applicable to containers of different volume capacities, as taught by my copending application No. 161,471, filed December 22, 1961.

The inner end shell 14 is initially the same diameter and flange depth as the top and bottom end shells and differs only in the provision of the spherical embossment. When the shell is to be employed as the inner end shell of the invention, it undergoes a reforming operation whereby a small predetermined amount of the flange is trimmed off and the taper of the flange is changed so that the outside diameter of the flange edges, the point of greatest diameter, will be substantially the same as the inside diameter of center band marginal flange edges 50, the point of least diameter. The diameter is also substantially the same as the inside diameter of the center band intermediate portion 48. This is so that the shell will pass through the opening of least diameter of the center band for securement to the interior surface of the intermediate portion 48. It may be necessary to expand the flange edge of the end shell 14 slightly to hold it in the desired position during the fusion welding of the two components.

The bottom end shell 12 is welded to the center band bottom margin flange edges first; then the inner end shell 14 is brought into desired position with respect to the intermediate portion 48, and then the top end shell 12 is secured in place. The chime skirts are the last components to be secured and if the skirt does not have an annular shoulder but is as shown in FIG. 1, it will be necessary to provide a stop member (not shown) on the assembly jig so as to limit how far axially inwardly the skirt will slip over each end shell 12 before it is secured tangentially to the end shell.

The assembled single walled double compartment container 10 is designed so that the lower or gas contained compartment will always have sufficient volume capacity to drive out substantially the last drop of beer.

A novel feature of assembly which enhances the versatility of the container is that alternatively or in addition to the variation of one of the marginal flanges, preferably the top marginal flange, to secure added or decreased liquid volume capacity, the inner end shell 14 may be moved axially along the length of the annular flat intermediate portion 48 before being secured so as to allow, correspondingly, increased or decreased volume capacity of both compartments, as shown by phantom line position of the shell 14'. The gas volume capacity is designed to always remain adequate to handle the particular resulting liquid volume capacity.

*Operation*

In operating the double compartment container 10, it is generally stood upright, in the position shown in FIG. 1. A suitable conduit connection, indicated only in phantom line 58, is made between the fitting 32 of the gas compartment and fitting 28, said connection passing from fitting 32 through the chime skirt opening 59 up to connection with the fitting 28 of the liquid compartment. The spherical embossment 40 serves as a sump which is in direct alignment with the top end shell aperture 26 so that a dip stick or down tube (not shown) may extend into it for obtaining substantially complete drainage, as taught by my copending application No. 161,465, filed December 22, 1961, now abandoned. The phantom line 60 serves to indicate that the beer is drawn out from the liquid compartment through the fitting 28 while the gas pressure is admitted through said fitting.

What is claimed is:

A single walled double compartment barrel comprising,
 a first dome shaped shell,
 a tapered flange having a predetermined diameter at one extremity of said first dome shaped shell,
 a single walled chime skirt attached to said first dome shaped shell,
 a generally cylindrical center band,
 a first tapered marginal flange at one end of said center band attached to said tapered flange of said first dome shaped shell,
 an annular flat intermediate surface in said center band,
 a second tapered marginal flange at the other end of said center band,
 a second dome shaped shell identical to said first dome shaped shell,
 a tapered flange having the same predetermined diameter as said tapered flange of said first dome shaped shell at one extremity of said second dome shaped shell and attached to said second tapered marginal flange of said center band,
 a single walled chime skirt attached to said second dome shaped shell,
 a third dome shaped shell identical to said first and second dome shaped shells,
 a tapered flange having the same predetermined diameter as said tapered flanges of said first and second dome shaped shells at one extremity of said third dome shaped shell and attached to said flat intermediate surface of said center band forming two compartments within said barrel,
 a generally centrally located spherical embossment in said third dome shaped shell facilitating drainage of the contents of one compartment of said barrel, and apertures in said first and second dome shaped shells at the axial extremity of said barrel, said apertures adapted to receive connecting means providing an external communication of fluids between the two compartments of said barrel.

References Cited by the Examiner

UNITED STATES PATENTS

| | | | |
|---|---|---|---|
| 2,161,155 | 6/39 | Gettelman. | |
| 2,285,903 | 6/42 | Clark | 113—46 |
| 2,362,658 | 11/44 | Meyer | 220—5 |
| 2,381,386 | 8/45 | Kuhn | 113—120 |
| 2,404,484 | 7/46 | Gettelman. | |
| 2,476,826 | 7/49 | Conger | 113—120 |
| 2,624,486 | 1/53 | Lee | 220—5 |
| 2,632,577 | 3/53 | Sacco | 220—5 |
| 2,696,323 | 12/54 | Sanderson | 220—5 |

THERON E. CONDON, *Primary Examiner.*

EARLE J. DRUMMOND, GEORGE O. RALSTON,
*Examiners.*